Dec. 8, 1942.　　　S. W. E. ANDERSSON　　　2,304,068
REFRIGERATION
Filed May 4, 1940
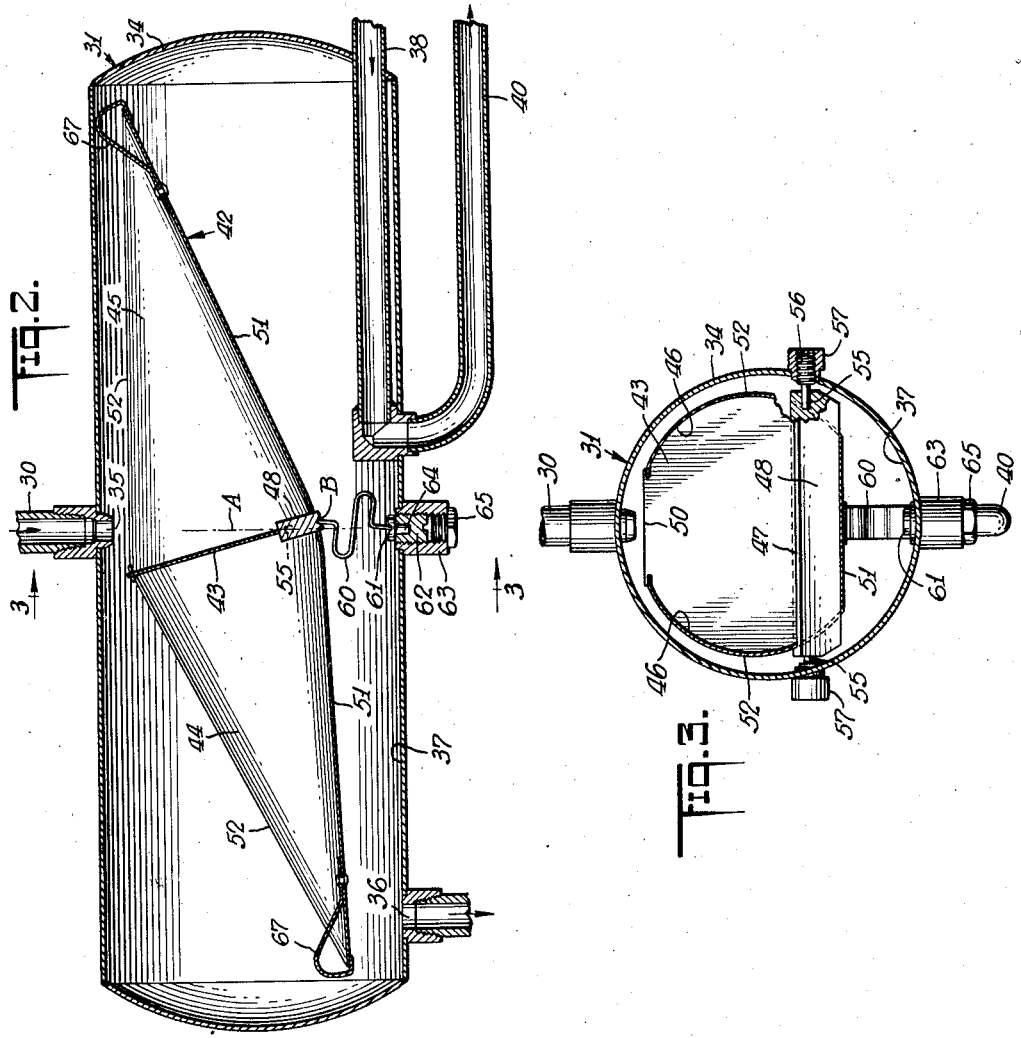
INVENTOR
Sven W. E. Andersson
BY
his ATTORNEY Patented Dec. 8, 1942

2,304,068

UNITED STATES PATENT OFFICE 2,304,068

REFRIGERATION

Sven W. E. Andersson, Evansville, Ind., assignor to Servel, Inc., New York, N. Y., a corporation of Delaware Application May 4, 1940, Serial No. 333,280

4 Claims. (Cl. 62—125)

The present invention relates to the art of refrigeration, and more particularly to a new and improved system for transferring heat to effect cooling at a region above a source of refrigeration.

One object of the present invention is to provide a new and improved heat transfer system of the general type above referred to.

Another object is to provide a heat transfer system of the above type, having new and improved means for raising liquid refrigerant from a low level to a higher level without resorting to the expedients of mechanical power pumps or other similar power means.

Another object is to provide a heat transfer system of the above type, in which the number of valves for raising liquid refrigerant to a higher level is reduced to a minimum.

Another object is to provide a heat transfer system of the above type, in which refrigeration loss is reduced to a minimum.

Another object is to provide a new and improved device for creating liquid lifting vapor pressure.

Another object is to provide a heat transfer system of the above type, having a liquid refrigerant lifting device, which is of simple, rugged and practical construction, which is more positive and more dependable in operation than for example a simply syphoning arrangement, and which is well suited to meet the requirements of economical manufacture.

Various other objects of the invention will be apparent from the following particular description, and from an inspection of the accompanying drawing, in which—

Fig. 1 is a diagrammatic view, partly in side elevation and partly in section, showing a refrigerating system embodying my invention, Fig. 2 is a longitudinal section through the refrigerant liquid lifting device, forming part of the system shown in Fig. 1, and Fig. 3 is a transverse section taken on line 3—3 of Fig. 2.

The invention is shown in connection with a primary refrigerating system of the Platen-Munters absorption type, having an evaporator or cooling unit 10, which is located remotely below a heat insulated region or chamber 11 to be refrigerated, and which constitutes a source of refrigeration for said chamber. This primary evaporator unit 10 is shown of the type comprising a cylinder 13, enclosed in a heat insulated shell 12, and provided at its upper end with an annular tray 14, into which is delivered a suitable volatile liquid refrigerant such as ammonia by means of a pipe 15. This ammonia overflows from the tray 14, and passes downwardly along the sides of the cylinder 13.

A suitable inert gas such as hydrogen is admitted into the cylinder 13 through an inlet 16, and flows upwardly to the top of the shell 12, and then downwardly along the outside of said cylinder to diffuse the ammonia. The effect of introducing hydrogen into the evaporator unit 10 is to reduce the partial pressure of the ammonia vapor in accordance with Dalton's law of partial pressures, and to cause evaporation of the ammonia with consequent absorption of heat from the surroundings.

The mixture of ammonia vapors and hydrogen is discharged from the bottom of the shell 12 through an outlet 17, and delivered to the other parts of the primary refrigerating system. These other parts may comprise generally an absorber into which the mixture of ammonia vapors and hydrogen is delivered for absorption of the ammonia into a liquid absorbent such as water. The separated inert hydrogen gas is returned to the cylinder 13 through the inlet 16, while the enriched absorption liquid is conducted to a generator. Ammonia is then expelled from the absorption solution by heating of the generator. This expelled ammonia is liquified in a condenser, and then returned to the evaporator unit 10 through the conduit 15 to complete the cycle in the primary refrigerating system. The weakened absorption solution from which the ammonia has been expelled is conducted from the generator to the absorber to absorb ammonia gas.

The primary refrigerating system, which is not completely shown in the drawing for the sake of simplicity, forms per se no part of the present invention, and as far as certain aspects of the invention are concerned may be of any other suitable type.

The secondary system for transferring the heat from the storage chamber 11 to be cooled to the primary evaporator unit 10 comprises a secondary evaporator unit 20, disposed in said chamber, and shown of the flooded type with a header or receiver 21, and a finned serpentined coil 22 connected to said header.

The secondary heat transfer system also includes a condenser coil 23, forming with the secondary evaporator unit 20 part of a closed fluid circuit containing a suitable volatile refrigerant. This condenser coil 23 is disposed below the secondary evaporator unit 20, and is arranged around the cylinder 13 so that the liquid ammonia in the shell 12 overflows from the tray 14 in sheet-like form over the successive turns of said coil. Refrigeration resulting from the evaporation of the ammonia in the primary evaporator unit 10 cools the condenser coils 23, and thereby causes evaporation of the liquid refrigerant in the secondary evaporator unit 20, and resultant cooling of the storage chamber 11. The vapor flows from the evaporator unit 20 downwardly through a conduit 24, and into the upper inlet end of the condenser coil 23 where it is cooled and condensed by the primary evaporator unit 10.

It is seen that the secondary transfer heat system in effect transfers the heat from the storage compartment 11 to the primary evaporator unit 10, constituting the point of refrigeration of the primary refrigerating system.

Since the condenser 23 is disposed at a lower level than the secondary evaporator unit 20, means must be provided to return the condensed liquid in the secondary heat transfer system from the condenser 23 to said evaporator unit, so that this system is cyclically operated for continuous cooling of the storage space 11. For that purpose, the refrigerant condensate from the condenser 23 discharges into a receiver 26 at the lower end of said condenser, and from there flows successively through a filter 27, a check valve 28, and a pipe 30, and into a lift device 31, which raises the condensate through a riser pipe 32 for discharge into the evaporator header 21.

The lift device 31 comprises a vessel 34, shown in the form of a horizontal cylindrical drum, and having centrally at its top an inlet 35 to which the pipe 30 is connected, and an outlet 36 at its bottom near one end to which the riser pipe 32 is affixed.

The vessel 34 is provided in the interior thereof with a surface, which is hot enough to vaporize a portion of the refrigerant of the secondary heat transfer system when said refrigerant is dumped thereon as will be described. If the vessel 34 is located in a comparatively warm room, the heat of this room may be sufficient to maintain the walls of said vessel at a vaporizing temperature, so that its inner wall surface 37 will constitute the refrigerant vaporizing surface of the device. If the heat of the room alone is not sufficient to effect evaporation of the refrigerant, then vaporizing heat may be supplied by some suitable form of heating means. In the specific form shown, this vaporizing heat is supplied by the warm outlet water from the unit delivered into the interior of the vessel 34 through a pipe 38 extending along the bottom of said vessel, and discharged from said vessel through a return pipe 40. With this arrangement, the outside of the pipe 38 serves as the refrigerant vaporizing surface, and may impart sufficient heat to the walls of the vessel 34, so that these walls also serve as refrigerant vaporizing surfaces.

Where vaporizing heat is supplied to the vessel 34 from an outside source as for instance by a burner or by the expedient of the hot water pipe 38 shown, said vessel is desirably protected by suitable heat insulation.

Means are provided in the interior of the vessel 34 for collecting the refrigerant condensate as it is discharged into said vessel through the inlet 35, and supporting it away from the refrigerant vaporizing surfaces of the device until said refrigerant is dumped into thermal contact with said surfaces. In the specific form shown, this means comprises a receptacle 42, divided by a central plate 43 into a pair of adjoining similar buckets 44 and 45. This plate 43 is desirably shaped with arcuate side edges 46, a flat bottom edge 47 secured to a frame bar 48, and a flat top edge 50. The bottom wall of the receptacle 42 is shown formed by a pair of flat plates 51, diverging slightly upwardly from the frame bar 48, while the side walls of said receptacle are shown formed by curved plates 52, extending from the arcuate sides of the partition plate 43, and along the sides of the respective bottom plates 51.

These side plates 52 taper towards the outer edges of the bottom plates 51, so that the two buckets 44 and 45 will be substantially scoop-shaped as shown.

The receptacle 42 is pivotally supported for tilting movement, desirably by means of trunnions 55, journalled into the opposite ends of the frame bar 48, and extending axially inwardly from screws 56 respectively, these being threaded into respective bushings 57 on the sides of the vessel 34.

The receptacle 42 is tilted from the position shown in Fig. 2 to a reverse position with respect thereto, and is yieldably held in either one of these two extreme positions by means of a spring snap device, desirably comprising a leaf spring 60, compressively coiled as shown, and having its upper end anchored in a V-shaped recess in the lower edge of the frame bar 48, and having its lower end anchored in a V-shaped recess of a headed pin 61. The tension of this spring 60 may be regulated by means of a stud 62, which is threaded in a bushing 63 on the lower side of the vessel 34, and which serves as a seat for the head of the pin 61, and as a journal for the depending shank 64 of said pin. A plug 65 may be threaded in the lower end of the bushing 63 to close said bushing.

The lower end of the spring 60, and the pivot axis of the trunnions 55 are in substantial vertical alignment along a common center line A, while the lines of action of the frame bar 48 and of said spring meet at the point B on either side of said center line in either extreme tilted position of the receptacle 42. By means of this arrangement, the scoop device described operates as a spring toggle.

In order to predetermine the two extreme tilted positions of the receptacle 42, limiting stops are provided, desirably in the form of curved plates 67, connected to the outer ends of the bottom bucket walls 51 respectively, and adapted to engage the top wall of the vessel 34 in said extreme positions. These curved plates 67 have a certain spring action, so that they act as bumpers to dampen the shock caused by the snap stop engagement of these plates with the top wall of the vessel 34.

It should be noted that the receptacle 42 is pivotally supported near the heel of the two component scoop-like buckets 44 and 45, so that the liquid in the buckets in filling position has its center of gravity spaced horizontally from the vertical plane of the pivot supports 55, and thereby creates a gravitational leverage on the filling bucket tending to tilt it.

It should also be noted that the receptacle 42 is so constructed and so positioned with respect to the inlet 35, that either bucket in extreme position of said receptacle will be disposed directly below said inlet in filling position, with its bottom wall 51 inclined upwardly from the frame bar 48, while the other bucket is in dumping position with its bottom wall 51 inclined downwardly.

In the operation of the lifting device 31, assuming that the receptacle 42 is in the tilted position shown in Fig. 2, the bucket 45 will be in filling position with respect to the inlet 35, so that the condensate, which flows from the condenser 23 through the receiver 26 and through the check valve 28 is discharged in said bucket and supported therein away from the vaporizing surfaces in the vessel 34. When the weight of the condensate in the bucket 45 is sufficient to gravitationally overbalance the spring tension of the toggle yieldably holding the receptical 42 in the position shown, said receptacle will snap clockwise about its pivotal supports 55 until the left hand stop 67 reaches the top wall of the vessel 34. In this position of the receptacle 42, the bucket 45 will dump its contents over and in thermal contact with the heated pipe 38 and the walls of the vessel 34, while the other bucket 44 will be in filling position with respect to the inlet 35.

Some of the dumped refrigerant will vaporize and create thereby above the level of the remaining liquid a pressure, which drives said liquid through the outlet 36 and up through the riser pipe 32 until it overflows into the header 21. During this lifting operation, the vapor pressure created in the vessel 34 closes the check valve 28 against return flow, so that the receiver 26 collects and holds the condensate from the condenser 23.

The pressure created by vaporization of part of the dumped refrigerant as described is sufficient to break the seal formed by the trap 70 between the outlet 36 and the riser pipe 32, so that the entire contents of the pipe 32 will be discharged into the header 21. When the liquid refrigerant in the vessel 34 and the riser pipe 32 has been evacuated, this pipe, serving as a vent, reduces the pressure in said vessel, and thereby permits the check valve 28 to open again, and the condensate which has collected in the receiver 26 to flow into the bucket 44 whereupon the cycle is repeated.

As far as certain aspects of the invention are concerned, in place of the spring snap arrangement shown, the receptacle 42 may be weighted as for instance at the upper end of the partition plate 43, or if desired, a combination of spring snap device and counter-weight may be used.

Also, instead of using a double alternately operating bucket arrangement as described, as far as certain aspects of the invention are concerned, a single bucket may be provided which is automatically returned into filling position by some spring or counter-weight device, after said bucket has been tilted into dumping position.

Although certain novel features of the invention have been shown and described and are pointed out in the annexed claims, it will be understod that various omissions, substitutions and changes in the several steps of the method and in its operation and in the form and details of the apparatus illustrated may be made by those skilled in the art without departing from the spirit of the invention.

Having thus described my invention, what I claim as new and desire to secure by Letters Patent is:

1. A heat transfer circuit including an evaporator, a condenser at an elevation below that of said evaporator, a conduit for vapor from said evaporator to said condenser, a vessel located at a level below that of said condenser, a conduit for conducting liquid from said condenser to said vessel by gravity flow, means for preventing a reverse flow of liquid in said last conduit, a tilt-type bucket in said vessel aranged to accumulate liquid entering said vessel, means for heating at least the lower part of said vessel, said bucket being operative to intermittently dump the accumulated liquid into said vessel so that the liquid becomes heated by said part, and a conduit connected to the lower part of said vessel and communicating with said evaporator so that upon increase in vapor pressure in said vessel liquid is forced from the vessel through said last conduit upward to said evaporator, the upper end of said last conduit being in open communication through said circuit with said condenser so as to equalize the pressures in said vessel and said condenser immediately following each upward transfer of liquid to permit resumption of gravity flow of liquid from said condenser to said bucket.

2. The combination with a water cooled refrigerating apparatus of a heat transfer circuit including a condenser cooled by said apparatus, an evaporator located at a level above that of said condenser, a conduit for vapor from said evaporator to said condenser, a vessel below said condenser, a conduit for conducting liquid by gravity flow from said condenser to said vessel, a means for preventing reverse flow of liquid in said last conduit, a tilt-type bucket in said vessel for accumulating liquid entering said vessel and intermittently dumping the accumulated liquid into said vessel, means for conducting water which has been used to cool said refrigerating apparatus into heating relation with said vessel so as to heat liquid which has been dumped by said bucket, and a conduit for conducting liquid from said vessel upward to said evaporator under pressure of vapor in said vessel due to heating of liquid therein, the upper end of said last conduit being in open communication through said circuit wtih said condenser so as to relieve the pressure in said vessel immediately after each transfer of liquid through said last conduit and thereby permit immediate resumption of gravity flow of liquid into said bucket.

3. In a heat transfer circuit comprising an evaporator and a condenser at a lower level than that of the evaporator and containing a fluid which is evaporated in the evaporator and condensed in the condenser, means for receiving condensed liquid by gravity flow from said condenser and raising the liquid to said evaporator comprising a vessel having a liquid inlet, a tilt-type bucket arranged to accumulate liquid entering through said inlet and intermittently dump accumulated liquid into said vessel, means for heating liquid which has been dumped into said vessel, and a delivery line from said vessel arranged to be sealed by dumped liquid so that vapor pressure in said vessel increases and forces liquid out of said vessel through said delivery line to said evaporator, whereupon the said vapor pressure is relieved through said line to permit immediate resumption of gravity liquid flow to said inlet.

4. A heat transfer circuit including an evaporator, a condenser at a level below that of said evaporator, a conduit for vapor from said evaporator to said condenser, a vessel connected for gravity flow of liquid thereto from said condenser, means for preventing reverse flow of liquid from said vessel toward said condenser, a line for conducting liquid to transfer the liquid from said vessel upward to said evaporator responsive to increase in vapor pressure in said vessel, and means including a tilt-type bucket operated by flow of liquid to said vessel for controlling pressure increase in said vessel, said line providing for release of vapor from said vessel immediately after each liquid transfer.

SVEN W. E. ANDERSSON.